June 2, 1970  H. KOTKAS ET AL  3,515,333

COMBINATION WRAP-BASE ROLL BOX

Filed Feb. 13, 1969  2 Sheets-Sheet 1

HEITI KOTKAS
JAMES R. JOHNSTON
INVENTORS

BY *Walter O. Hodson*

*Karl T. [signature]*
ATTORNEYS

June 2, 1970  H. KOTKAS ET AL  3,515,333
COMBINATION WRAP-BASE ROLL BOX
Filed Feb. 13, 1969  2 Sheets-Sheet 2

HEITI KOTKAS
JAMES R. JOHNSTON
INVENTORS

BY
ATTORNEYS 3,515,333
COMBINATION WRAP-BASE ROLL BOX
Heiti Kotkas and James R. Johnston, Rochester, N.Y., assignors to Eastman Kodak Company, Rochester, N.Y., a corporation of New Jersey
Filed Feb. 13, 1969, Ser. No. 798,947
Int. Cl. B65d 5/54, 85/20
U.S. Cl. 229—40     4 Claims

ABSTRACT OF THE DISCLOSURE

A light-tight, moisture-proof box for a roll of product comprising an inner wrap formed up and around the roll and enclosed by a cover telescoped down over, and fixed to, the inner wrap. Access to the product is through the end wall of the cover which is provided with a reclosable tear-away section.

---

The present invention relates to a package for a roll of strip material, and particularly to a light-tight, moisture-proof package for roll photographic products having a reclosable end wall to provide access to the contents.

One object of the present invention is to provide a box for a roll of product that is essentially comprised of two half boxes that are fitted over one another to enclose the roll, and in which each half box is formed up from a flat blank of scored paperboard so that the box parts require a minimum of storage space prior to use.

Another object is to provide a box for a roll of product wherein the inner half box is interleaved with a light and moisture proof laminate wrapper provided with a portion at the end to permit opening the end of the inner wrapping for access to the roll of product.

And a further object is to provide a box of the type described wherein the two half boxes are sealed together when once brought together and access to the roll product is had through the end of the outer box which is provided with a tear-away section forming a tab which is engageable with a slot in the end of the box for reclosing the same.

The invention comprises, broadly, a box for roll photographic products which does not require a full setup box to insure light-tightness and a barrier to moisture. The bottom of the box comprises a blank of black, flat paperboard which is scored lengthwise to permit it to be wrapped up and around a roll of product and provide substantially flat sides and a flat bottom wall. A separate sheet of light and moisture proof paper placed on top of the paperboard base is wrapped around the roll product as the base is formed up. This sheet of paper extends beyond the ends of the roll and the paperboard base end has its end folded upon the end of the roll in the conventional way with the exception that a flap extending from the bottom edge of each end of the base folds up against the end of the roll before the last two ears of the paper are folded in. The cover, after being folded up from a scored flat blank of corrugated board, is telescoped down onto the bottom and permanently taped in position. One end of the cover has a perforated tear-away section which allows unloading the package from the end without removing the cover. The tear-away section is provided with a specially formed locking tab which snaps between and behind two folded flaps on the end of the cover to allow reclosing the package for reuse.

The novel features that we consider characteristic of our invention are set forth with particularity in the appended claims. The invention itself, however, both as to its organization and its methods of operation, together with additional objects and advantages thereof will best be understood from the following description of the specific embodiments when read in connection with the accompanying drawings in which:

Figure 6:
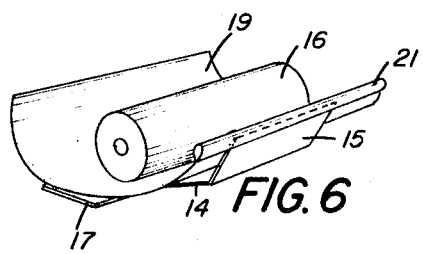
Figure 7:
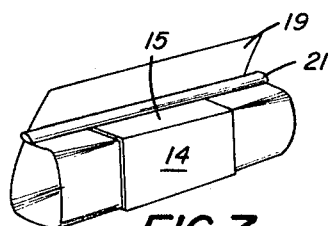

Referring now to the drawings, the bottom or inner member of the box comprises a black, flat, paperboard base 10 which is scored lengthwise to form five panels 11, 12, 13, 14 and 15 to permit it to be folded up and around a roll of product 16 and provide the bottom for the box as illustrated in FIGS. 6-9. Extending from and hingedly connected to each end of panel 13 is an end flap 17 having a finger notch 18 therein to aid in unfolding the end flap 17 when access to the contents of the box is desired, as will be explained below. A separate sheet of light and moisture proof sheeting 19 placed on top of the paper board base 10 and beneath the roll of product, FIG. 6, is wrapped around the roll of product as the base is formed up as shown in FIGS. 6-9. The panel 13 of the box 10, which forms the bottom of the finished box, is slightly longer than the roll of product, and has a width approximately equal to the diameter of the roll of product. Panels 11 and 12, and 14 are substantially equal in width and length to panel 13 so that they will embrace the roll when the base 10 is folded up and around it. The sheeting 19 can be any suitable material having the desired moisture proof properties, and a poly-kraft-poly laminate or a single film of rubber modified polyethylene have been found particularly suitable because of their heat sealing properties. The sheeting 19 is folded back around the edge of the panel 15 of the base blank 10 as indicated at 21, and is adhered to the outside surface of the panel 15 by heat sealing, or by a suitable adhesive, for fixing and locating the sheeting on the base. This folded back edge of the sheeting 19 yields a poly-to-poly contact along the width of the roll for better moisture barrier properties. After the base is wrapped around the roll, it is fastened in this condition by means of a strip of adhesive tape 20.

As clearly shown in FIGS. 3 and 6-9, the sheeting 19 extends beyond the ends of the roll and paperboard base 10 and has its ends folded upon the ends of the roll in the conventional way with the exception that the flap 17 folds up against the end of the roll before the last two ears 23 and 25 of the sheeting are folded in. A right angle clamp member, shown at 24, may be used to hold the flap 17 up against the end of the roll while the cover is being formed and is utimately slid down over the inner wrap.

Figure 1:
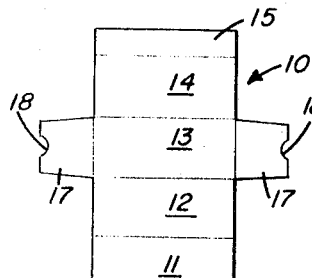
FIG. 1 is a plan view of the blank from which the inner member of the box is formed.
Figure 2:
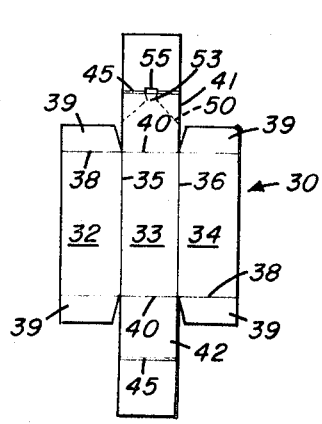
FIG. 2 is a plan view of the blank from which the cover of the box is formed.
Figure 3:
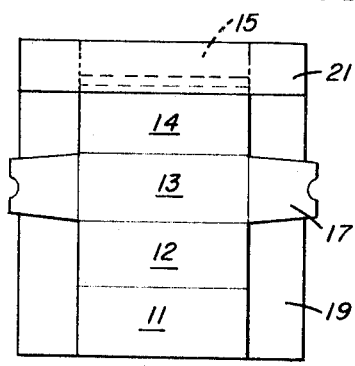
FIG. 3 is a plan view of the wrap-base assembly of the inner member of the box.
Figure 4:
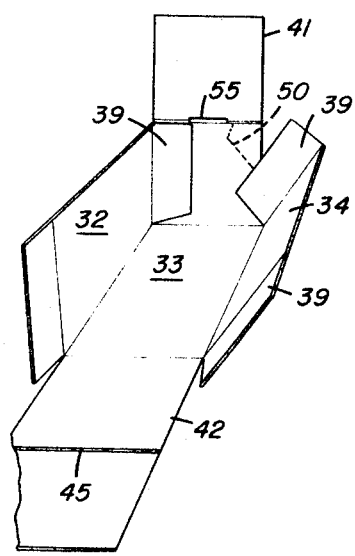
FIGS. 4 and 5 are perspective views showing how the cover of the box is formed up from its blank.
Figure 5:
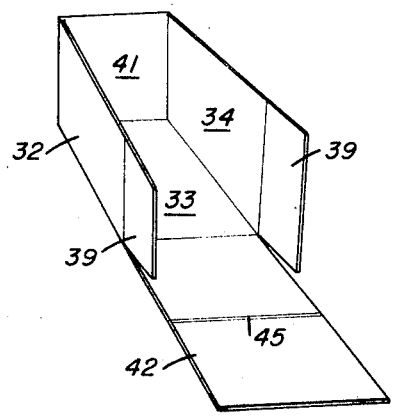
Figure 8:
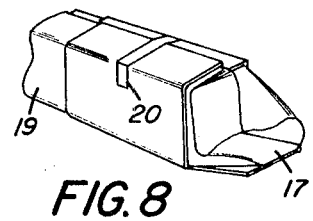
FIGS. 6-9 are perspective views showing how the roll of product is wrapped in the inner box member.
Figure 9:
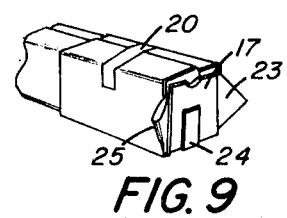
Figure 10:
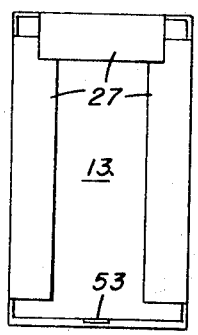
FIG. 10 is a bottom plan view of the completed box.

The cover of the box is formed up from a flat blank 30 of corrugated board of novel format, see FIG. 2 and is held in place on the bottom by strips of adhesive tape 27 once it is telescoped down over the same, see FIG. 10. Referring to FIG. 2, the cover blank 30 is divided into three long panels 32, 33 and 34 by parallel score lines 35 and 36. Panel 33 is the top of the cover and panels 32 and 34 are the side walls thereof. Hinged to each end of the panels 32 and 34 by score lines 38 are tongues 39. Hinged to opposite ends of the panel 33 by score lines 40 are end flaps 41 and 42. The flaps 41 and 42 are approximately twice as long as the panels 32 and 34 are wide and they are divided approximately in half by a double score line 45 which permits the flaps to be folded back upon themselves to provide double end walls for the cover as shown in FIGS. 4 and 5. The outer one of the double end walls is provided with a tear-away section 50 defined by two weakened lines of separation 52 extending in spaced relation from the double score line 45 to the edges of the wall. The tear-away section terminates at the double score line 45 in a tab portion 53, and to facilitate this tab portion being grasped by the fingers to separate the tear-away section 50 from the remainder of the double end wall of which it forms a part, a finger slot 55 is cut out of the double score line 45 at the end of the tab portion 53.

Figure 11:
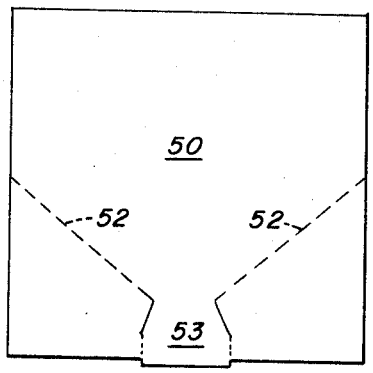
FIG. 11 is an enlarged end view of the completed and unopened box.

Referring to FIGS. 4 and 5, the cover is formed up by first folding the side panels 32 and 34 up from the panel 33 along the score lines 35 and 36 and the tongues 39 are folded inwardly. The end flaps 41 and 42 are then folded up against the outside of the tongues 39 and then folded down along the double score line 45 to overlap the tongues and form the double end wall of the cover. When the cover is formed up and telescoped down over the wrapped roll, the openable end of the completed box will appear as shown in FIG. 11.

Referring now to FIGS. 13–17 in sequence, the suggested procedure for opening this box is as follows: starting with the box upright, pull out and up on tab portion 53 and fold the tear-away section 50 with the tab portion over the top of the box. Next, pull down the portion 55 of the outer end wall left by the tear-away section 50 along with the inner wall hinged thereto, and discard. Then unfold tongues 39 and overfold them to clear the end of the cover. Then unfold the flap 17 of the inner wrap and the ears of the folded sheeting using the finger notch 18 in the flap 17. Next, pull up on the inner fold of the sheeting 19 to expose the end of the roll. Remove the roll by grasping (with the index finger in the core of the roll and the thumb in any corner of the box) and pulling in the direction of the arrow.

Figure 12:
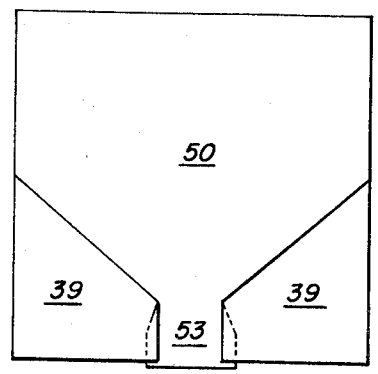
FIG. 12 is an enlarged end view of the box after being reclosed.
Figures 13, 14, 15:
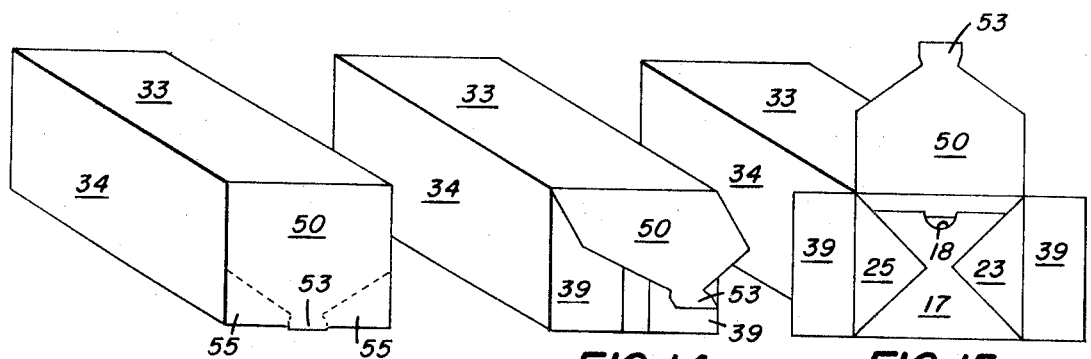
FIGS. 13-17 are schematic perspective views illustrating the suggested procedure for opening the box.
Figure 16:
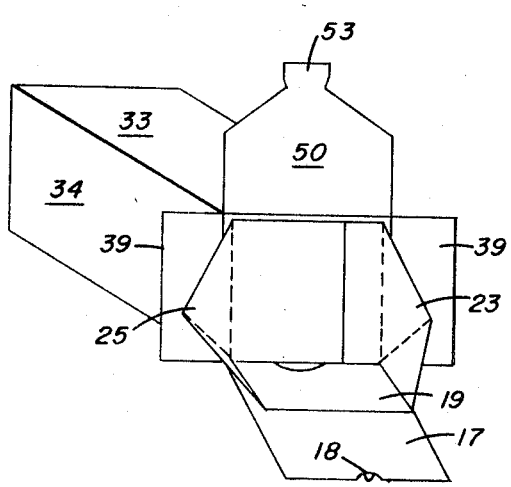
Figure 17:
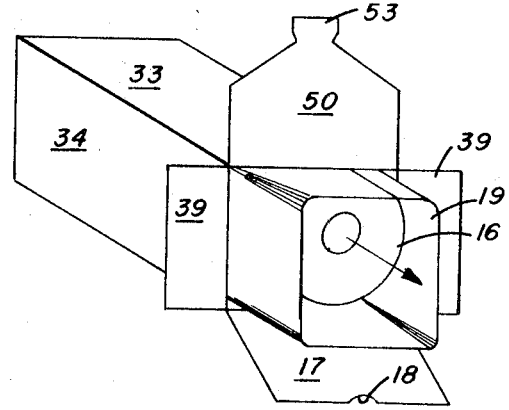

To reclose the box, guide the roll into the inner wrap and push it to the end of the box. Refold the end of the sheeting 19 and the flap 17 in the reverse order of unfolding, being sure to spread tongues 39 when folding up the flap 17. When folding is complete, place the thumb on tab portion 53, index finger under tear-away section 50, middle finger under tongue 39, and squeeze the tab portion 53 into the space separating the tongues 39 to lock the end wall of the cover closed. This reclosed position of the tear-away section 50 is most clearly shown in FIG. 12.

While we have shown and described certain specific embodiments of our invention, we are aware that many modifications thereof are possible. Our invention, therefore, is not to be limited to the precise details shown and described, but is intended to cover all modifications coming within the scope of the appended claims.

We claim:
1. A package for a roll of strip material comprising,
 (a) a substantially square open-ended wrapper formed up from a sheet of scored paperboard embracing said roll of material;
 (b) an end wall hinged to the end of one side of said wrapper to move to and from an operative position wherein it closes the end of said wrapper;
 (c) a cover of heavy board, including a top wall, front and rear walls joined by end walls, telescoped down over said wrapper to hold said hinged end wall in its operative position and sealed to said wrapper at points other than the end engaging said hinged end wall to prevent removal therefrom, the end wall of said cover adjacent said hinged end wall of the wrapper comprising,
  (1) a pair of end tongues hinged to the ends of the front and rear walls of said cover and folded toward one another, said tongues being of such size that they have a separation between their adjacent edges when folded toward one another;
  (2) a panel hinged to the end of the top wall of the cover having a length substantially twice that of the depth of said cover and scored intermediate its length to form a double end wall embracing said tongues when said panel is first hinged up at right angles to the top wall of the cover and doubled back upon itself along said score line; and
  (3) that portion of the panel forming the outer end wall of said cover and hinged to the top wall thereof provided with a tear-away section defined by two weakened lines of separation arranged to separate it from the remainder of the panel and provide a reclosing tab on its edge opposite the edge hinged to the top wall of the cover cooperable with the separated edges of said tongues for reclosing the end of said cover.

2. A package for a roll of strip material as defined in claim 1, wherein the tear-away section in the outer end wall of said cover is defined by a slit in said score line overlying and slightly longer than the separation between said pair of end flaps and by two weakened lines of separation extending in substantially parallel spaced relation at right angles to said slit toward the top of said cover, then diverging toward one another to a point where they are spaced apart by an amount less than the separation between said tongues and finally diverging in opposite directions to the edges of said outer end wall for separating the outer end wall into two parts to provide access to the end of said wrapper, and
 that portion of the tear-away section formed between those portions of the weakened lines of separation extending from the ends of said slit to the point where they diverge in opposite directions forming a locking tab insertable through the separation between said tongues and engageable behind the adjacent edges of said tongues for reclosing the end wall of said cover.

3. A package for a roll of strip material as defined in claim 1, wherein said strip material is a light-sensitive photographic product, and including a separate sheet of light and moisture proof sheeting lying on the inside surface of said sheet of scored paperboard and wrapped around said roll as the open-ended wrapper is formed up from said sheet of paperboard, said sheeting extending beyond the ends of said wrapper and having its ends folded upon the end of said roll in the conventional way except that the hinged end wall on the wrapper is moved to its operative position against the end of the roll before the last two ears of the sheeting are folded in upon the end of the roll.

4. A package for a roll of photographic product as defined in claim 3, wherein said separate sheet is a plastic material or a paper having a plastic coating on at least one surface thereof, one end of said separate sheet folded back upon itself and sealed in overlying relation with one end of the sheet of scored paperboard while the opposite end of the separate sheet extends to the opposite end of said sheet of scored paperboard, said open-ended wrapper when formed up having its one end brought into underlying relation with the opposite end of the sheet of scored paperboard and the end of the separate sheet superposed thereon to provide a plastic-to-plastic contact for improved moisture barrier properties.

References Cited

UNITED STATES PATENTS 2,607,476  8/1952  Rockefeller _____ 206—59
3,458,112  7/1969  Nelson _____ 229—40

DAVID M. BOCKENEK, Primary Examiner

U.S. Cl. X.R.

206—59; 229—51